(12) United States Patent
Lambert

(10) Patent No.: US 10,278,493 B2
(45) Date of Patent: May 7, 2019

(54) PARALLEL WIRE CABLE

(71) Applicant: Ultimate Strength Cable, LLC, Tulsa, OK (US)

(72) Inventor: Walter L. Lambert, Muskogee, OK (US)

(73) Assignee: Ultimate Strength Cable, LLC, Tulsa, OK (US)

(*) Notice: Subject to any disclaimer, the term of this patent is extended or adjusted under 35 U.S.C. 154(b) by 0 days.

(21) Appl. No.: 15/911,074

(22) Filed: Mar. 3, 2018

(65) Prior Publication Data

US 2018/0184805 A1 Jul. 5, 2018

Related U.S. Application Data

(63) Continuation of application No. 13/084,693, filed on Apr. 12, 2011, now abandoned.

(51) Int. Cl.
| | |
|---|---|
| *D07B 5/00* | (2006.01) |
| *E01D 19/16* | (2006.01) |
| *F16L 3/06* | (2006.01) |
| *A47B 81/00* | (2006.01) |
| *F16L 3/26* | (2006.01) |

(Continued)

(52) U.S. Cl.
CPC .............. *A47B 81/00* (2013.01); *B65G 67/04* (2013.01); *B65G 67/60* (2013.01); *D07B 5/002* (2013.01); *E01D 19/16* (2013.01); *F16L 3/06* (2013.01); *F16L 3/16* (2013.01); *F16L 3/26* (2013.01); *D07B 2501/203* (2013.01); *Y10T 29/49616* (2015.01); *Y10T 29/49828* (2015.01); *Y10T 428/12347* (2015.01)

(58) Field of Classification Search
CPC ........ A47B 81/00; B65G 67/60; B65G 67/04; F16L 3/16; F16L 3/06; F16L 3/26; D07B 5/002; D07B 2501/203; E01D 19/16; Y10T 29/49828; Y10T 29/49616; Y10T 428/12347; B21D 3/12; H01J 9/28; B21F 1/02; H01B 9/0611; B60C 9/0007
USPC ............. 140/139, 140, 147; 72/378; 174/24; 57/200
See application file for complete search history.

(56) References Cited

U.S. PATENT DOCUMENTS

| | | | |
|---|---|---|---|
| 364,077 | A | 5/1887 | Addis |
| 1,459,623 | A | 6/1923 | Gerrard et al. |

(Continued)

FOREIGN PATENT DOCUMENTS

| | | |
|---|---|---|
| CA | 2835139 | 1/2013 |
| DE | 19 38 931 A1 | 2/1971 |

(Continued)

OTHER PUBLICATIONS

Google Translation DE 103 090 825 A1, 6 pages, translated Jul. 5, 2018.

(Continued)

*Primary Examiner* — Ryan J. Walters
*Assistant Examiner* — Lawrence Averick
(74) *Attorney, Agent, or Firm* — Scott P. Zimmerman, PLLC

(57) ABSTRACT

A parallel wire cable is produced from a plurality of wires arranged in a bundle for use as a structural cable. Each wire in the plurality of wires is parallel to every other wire in the bundle, and each wire in the plurality of wires is tensioned to a tension value.

6 Claims, 7 Drawing Sheets

(51) Int. Cl.
  *F16L 3/16* (2006.01)
  *B65G 67/04* (2006.01)
  *B65G 67/60* (2006.01)

(56) References Cited

U.S. PATENT DOCUMENTS

| | | | | |
|---|---|---|---|---|
| 1,537,698 | A * | 5/1925 | Robinson | D07B 5/002 14/22 |
| 2,095,721 | A | 10/1937 | Sunderland | |
| 2,141,138 | A * | 12/1938 | Reed | E01D 19/14 14/23 |
| 2,501,202 | A | 3/1950 | Bartleman | |
| 2,803,363 | A | 8/1957 | Hutchinson | |
| 2,808,845 | A | 10/1957 | Wood | |
| 2,878,498 | A | 3/1959 | Gollnow | |
| 2,945,457 | A | 7/1960 | Avery et al. | |
| 3,083,817 | A | 4/1963 | Campbell | |
| 3,086,232 | A | 4/1963 | Nixon | |
| 3,153,696 | A | 10/1964 | Blanchard | |
| 3,379,000 | A | 4/1968 | Webber | |
| 3,443,607 | A * | 5/1969 | Dittrich | B21F 1/02 140/1 |
| 3,500,625 | A | 3/1970 | Gokyu | |
| 3,526,570 | A * | 9/1970 | Beighley | B65H 51/14 14/23 |
| 3,531,811 | A | 10/1970 | Baker et al. | |
| 3,542,087 | A | 11/1970 | Fegley | |
| 3,556,168 | A | 1/1971 | Baker et al. | |
| 3,586,226 | A * | 6/1971 | Nippert, Sr. | B21C 1/28 226/149 |
| 3,659,633 | A | 5/1972 | Durkee et al. | |
| 3,885,777 | A | 5/1975 | De Carbon | |
| 3,919,762 | A | 11/1975 | Borelly | |
| 4,044,447 | A | 8/1977 | Hamada | |
| 4,106,957 | A * | 8/1978 | Tournoy | B60C 9/0007 148/529 |
| 4,192,057 | A * | 3/1980 | Borelly | B21C 47/02 156/180 |
| 4,203,267 | A | 5/1980 | Langhorst | |
| 4,258,518 | A | 3/1981 | Xercavins | |
| 4,266,911 | A | 5/1981 | Helm | |
| 4,488,649 | A | 12/1984 | Mark | |
| 4,533,297 | A | 8/1985 | Bassett | |
| 4,594,827 | A | 6/1986 | Finsterwalder | |
| 4,617,789 | A | 10/1986 | Borden | |
| 4,648,146 | A | 3/1987 | Nutzel | |
| 4,673,309 | A | 6/1987 | Schlaich et al. | |
| 4,792,700 | A | 12/1988 | Ammons | |
| 4,840,214 | A * | 6/1989 | Bourgois | B60C 9/0007 152/527 |
| 4,841,714 | A | 6/1989 | Meier | |
| 4,979,871 | A | 12/1990 | Reiner | |
| 5,056,284 | A | 10/1991 | Ruckdeschel et al. | |
| 5,083,469 | A * | 1/1992 | Percheron | E04G 21/121 29/452 |
| 5,167,399 | A | 12/1992 | Delomel | |
| 5,299,913 | A | 4/1994 | Heidelberg | |
| 5,400,584 | A * | 3/1995 | Ito | D07B 5/002 57/13 |
| 5,543,196 | A * | 8/1996 | Robinson | A01K 1/007 160/330 |
| 5,573,852 | A | 11/1996 | Thal | |
| 5,688,098 | A | 11/1997 | Theno | |
| 5,809,710 | A * | 9/1998 | Jungwirth | E01D 19/16 14/22 |
| 5,888,321 | A * | 3/1999 | Kazama | B60C 9/0007 152/451 |
| 5,956,935 | A * | 9/1999 | Katayama | B60C 9/0007 152/527 |
| 6,109,460 | A | 8/2000 | Herlevi | |
| 6,315,249 | B1 | 11/2001 | Jensen | |
| 6,523,779 | B1 | 2/2003 | Elder | |
| 6,614,125 | B2 | 9/2003 | Willis et al. | |
| 6,658,684 | B2 | 12/2003 | Stubler et al. | |
| 6,715,176 | B2 | 4/2004 | Stubler | |
| 6,800,956 | B2 | 10/2004 | Bartlett | |
| 6,929,450 | B2 | 8/2005 | Noble | |
| 6,944,550 | B2 | 9/2005 | Marchetti | |
| 6,968,779 | B2 * | 11/2005 | Doyle | B65B 13/06 100/2 |
| 6,979,175 | B2 | 12/2005 | Drake | |
| 7,003,835 | B2 | 2/2006 | Figg, Jr. et al. | |
| 7,010,824 | B2 | 3/2006 | Stubler et al. | |
| 7,076,985 | B2 * | 7/2006 | Rex | B21C 47/04 72/289 |
| 7,105,940 | B2 | 9/2006 | Weesner | |
| 7,124,460 | B2 | 10/2006 | Lecinq et al. | |
| 7,126,235 | B2 | 10/2006 | Bernhoff | |
| 7,188,814 | B2 | 3/2007 | Davis | |
| 7,431,610 | B2 | 10/2008 | Laursen | |
| 7,508,088 | B2 | 3/2009 | Kothnur et al. | |
| 7,677,506 | B1 | 3/2010 | Hammer | |
| 7,683,498 | B2 | 3/2010 | Stommel | |
| 8,074,347 | B2 | 12/2011 | Anderson et al. | |
| 8,464,497 | B2 | 6/2013 | Lambert | |
| 8,667,766 | B2 | 3/2014 | Lambert | |
| 8,747,219 | B2 | 6/2014 | Wright et al. | |
| 8,759,678 | B2 | 6/2014 | Filatov | |
| 8,967,943 | B2 | 3/2015 | Drott | |
| 9,062,421 | B2 | 6/2015 | Brand | |
| 9,334,091 | B2 * | 5/2016 | Zantout | B65D 63/00 |
| 9,458,642 | B2 | 10/2016 | Lambert | |
| 9,743,764 | B2 * | 8/2017 | Lambert | E01D 19/16 |
| 10,036,118 | B2 * | 7/2018 | Cullen | D07B 5/00 |
| 10,149,536 | B2 * | 12/2018 | Lambert | E01D 19/16 |
| 2002/0095878 | A1 | 7/2002 | Henderson | |
| 2003/0086755 | A1 * | 5/2003 | Stubler | E01D 19/16 403/204 |
| 2003/0110583 | A1 | 6/2003 | Stubler | |
| 2003/0141721 | A1 | 7/2003 | Barlett | |
| 2004/0001752 | A1 | 1/2004 | Noble | |
| 2004/0128776 | A1 | 7/2004 | Eicher | |
| 2004/0237222 | A1 * | 12/2004 | Stubler | E01D 19/14 14/22 |
| 2004/0247438 | A1 | 12/2004 | McCoin | |
| 2004/0265127 | A1 | 12/2004 | Noble | |
| 2005/0151376 | A1 | 7/2005 | Bernhoff | |
| 2005/0193794 | A1 * | 9/2005 | Rex | B21C 47/04 72/289 |
| 2006/0185318 | A1 | 8/2006 | Lecinq | |
| 2007/0271897 | A1 | 11/2007 | Hanna | |
| 2008/0078128 | A1 | 4/2008 | Livingston et al. | |
| 2008/0116152 | A1 | 5/2008 | Datri | |
| 2008/0210330 | A1 | 9/2008 | Anderson et al. | |
| 2008/0250576 | A1 | 10/2008 | Brand et al. | |
| 2009/0126313 | A1 | 5/2009 | Jolly | |
| 2009/0167023 | A1 | 7/2009 | Nies | |
| 2009/0224498 | A1 | 9/2009 | Diedericks | |
| 2009/0307998 | A1 | 12/2009 | Zavitz et al. | |
| 2010/0090053 | A1 | 4/2010 | Stiltner | |
| 2010/0319983 | A1 | 12/2010 | De Abreu et al. | |
| 2010/0322766 | A1 | 12/2010 | Haans et al. | |
| 2011/0206510 | A1 | 8/2011 | Landen et al. | |
| 2011/0240626 | A1 | 10/2011 | Mullebrouck | |
| 2011/0278852 | A1 | 11/2011 | Hjort | |
| 2012/0045345 | A1 | 2/2012 | Horton, III | |
| 2012/0084948 | A1 * | 4/2012 | Breen, IV | B65D 63/1063 24/16 R |
| 2012/0139253 | A1 | 6/2012 | Lambert | |
| 2012/0260590 | A1 | 10/2012 | Lambert | |
| 2013/0305624 | A1 | 11/2013 | Thrush | |
| 2013/0309521 | A1 | 11/2013 | Lambert | |
| 2014/0361540 | A1 | 12/2014 | Knight | |
| 2015/0128384 | A1 * | 5/2015 | Breen, IV | B65D 63/1063 24/16 PB |
| 2015/0308414 | A1 | 10/2015 | Roer | |
| 2015/0335154 | A1 * | 11/2015 | Lambert | E01D 19/16 211/61 |
| 2016/0215761 | A1 | 7/2016 | Rohden | |
| 2016/0215762 | A1 | 7/2016 | Rohden | |
| 2016/0333853 | A1 | 11/2016 | Knight | |

(56) References Cited

U.S. PATENT DOCUMENTS

2017/0318962 A1\* 11/2017 Lambert ................ E01D 19/16
2017/0362772 A1\* 12/2017 Cullen .................... D07B 5/00
2018/0184805 A1\* 7/2018 Lambert ................ E01D 19/16

FOREIGN PATENT DOCUMENTS

DE        1938931     2/1971
DE     103090825     9/2004
EP        2732156     8/2016

OTHER PUBLICATIONS

Irvine, H. Max, "Cable Structures," 1981, MIT Press, Cambridge Massachusetts.

\* cited by examiner

PARALLEL WIRE CABLE

CROSS-REFERENCE TO RELATED APPLICATIONS

This application is a continuation of U.S. application Ser. No. 13/084,693 filed Apr. 12, 2011 and incorporated herein by reference in its entirety. This application also relates to European Patent No. 2580407, which also claims priority to U.S. application Ser. No. 13/084,693 filed Apr. 12, 2011.

BACKGROUND

Exemplary embodiments generally relate to static structures, to bridges, and to wireworking and, more particularly, to anchorage, to towers, to anchors, to cables, and to joining wire.

Parallel wire cables have long been desired as structural components. Parallel wire cables, for example, have been proposed for suspension bridges. Parallel wire cables are capable of superior strength and stiffness when compared to conventional helically-wound strands and cable. Parallel wire cables, though, have proven elusive. Conventional designs for parallel wire cables are far too costly to manufacture. Moreover, conventional manufacturing processes for parallel wire cables create troublesome tendencies to twist and coil, making handling and transportation difficult and even unsafe.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. Those of ordinary skill in the art further understand that the exemplary cables described herein are for illustrative purposes and, thus, are not intended to be limited to any particular manufacturing process and/or manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another.

Figure 1:
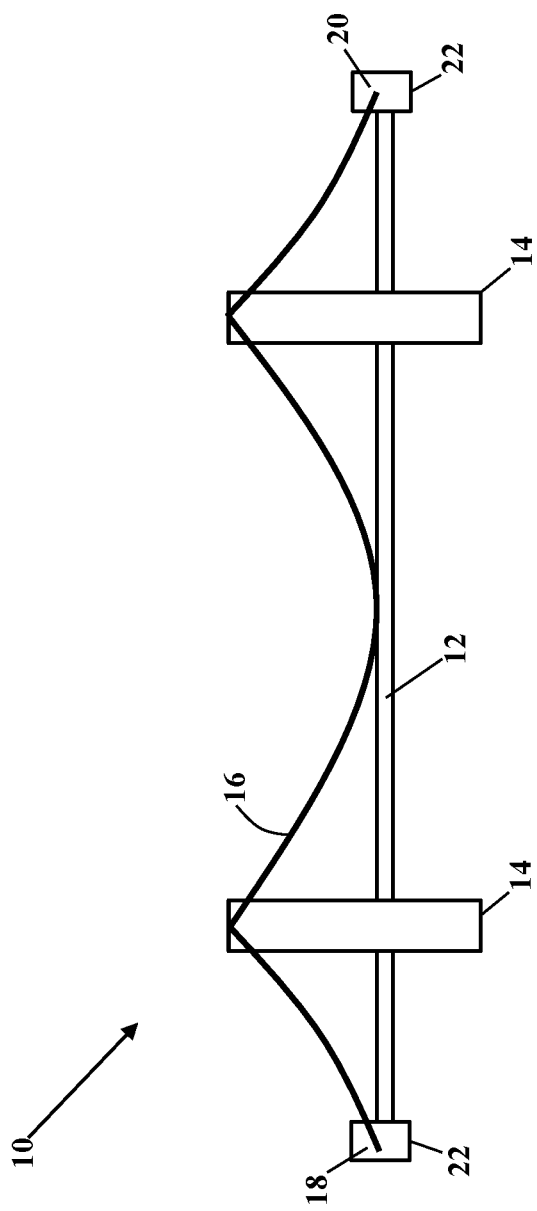
FIG. 1 is a schematic illustrating an operating environment, according to exemplary embodiments.

FIG. 1 is a schematic illustrating an operating environment, according to exemplary embodiments. FIG. 1 illustrates a suspension bridge 10 having a deck 12 supported by one or more pillars 14 (or "towers") and by a structural cable 16. The structural cable 16 is anchored at opposite ends 18 and 20 by structural anchors 22. Tension in the structural cable 16 helps support the weight of the deck 12. The design and structural behavior of the suspension bridge 10 is well-known to those of ordinary skill in the art, so this disclosure will not provide a further explanation of the suspension bridge 10.

Figure 2:
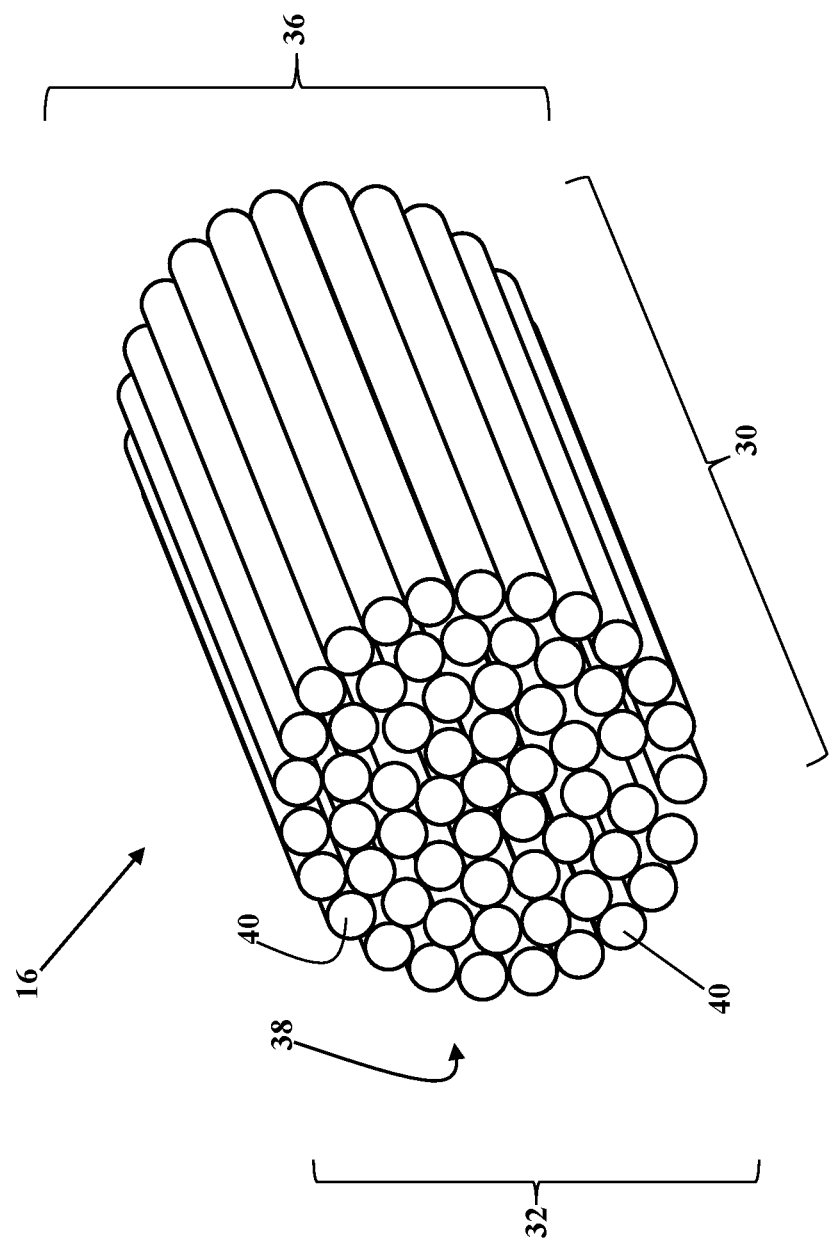
FIGS. 2 and 3 are more detailed schematics illustrating a structural cable, according to exemplary embodiments.
Figure 3:
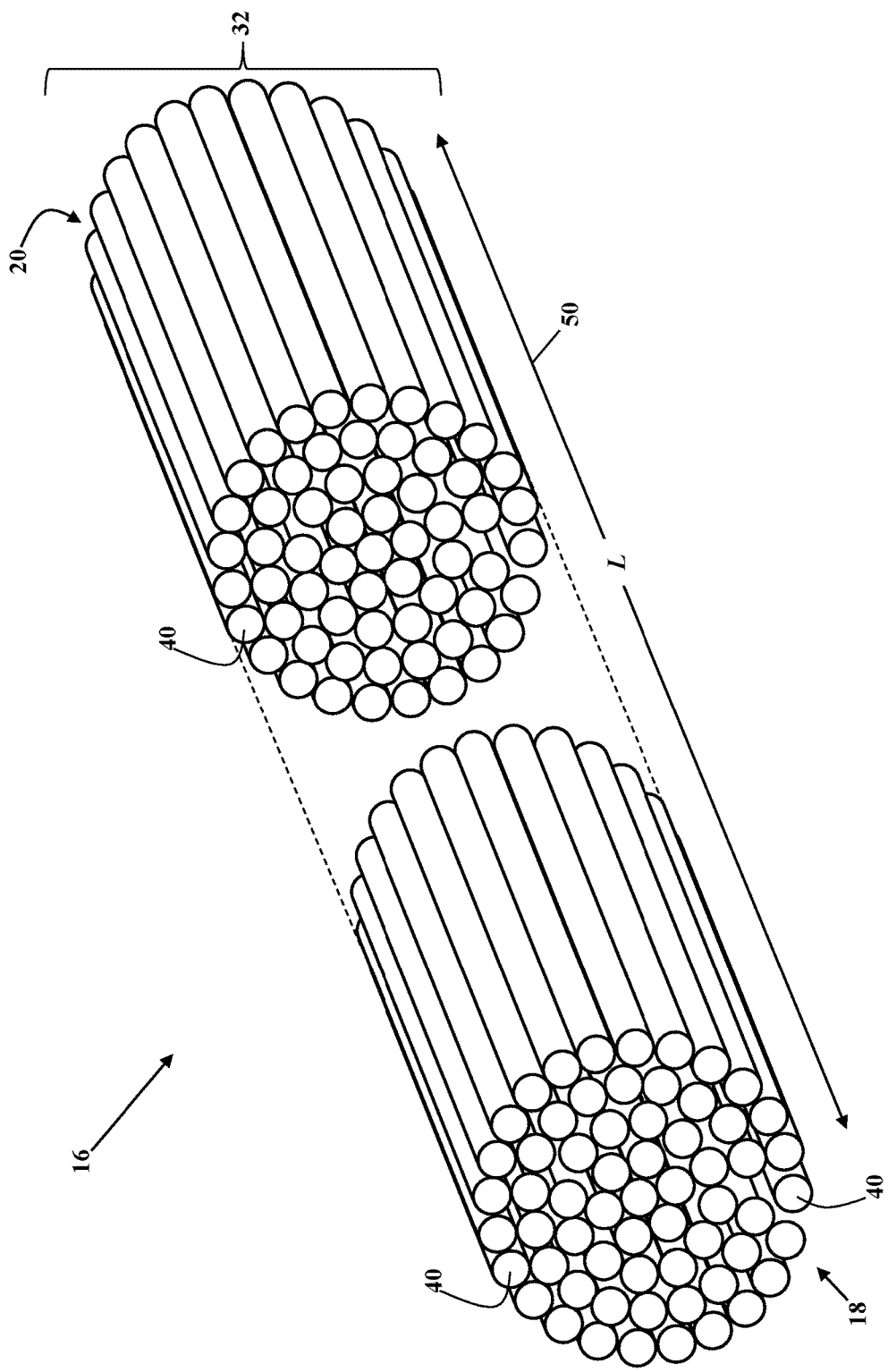

FIGS. 2 and 3 are more detailed schematics illustrating the structural cable 16, according to exemplary embodiments. FIG. 2 illustrates a longitudinal portion 30 of the structural cable 16. The structural cable 16 comprises a plurality 32 of individual wires. The plurality 32 of wires is illustrated as a bundle 36 having a circular shape 38. The plurality 32 of wires, however, may be bundled in any cross-sectional shape desired (such as hexagonal, triangular, or square). Each individual wire 40 in the plurality 32 of wires may be constructed of any metallic and/or non-metallic material. An individual wire 40, for example, may be 5 or 7 millimeter diameter steel wire (or any other diameter or gauge wire suitable for structural cable). Any of the individual wires 40, however, may be constructed from carbon fiber material, composite material, or even electrical conductors. Each individual wire 40 is illustrated as having a circular cross-sectional shape, but any of the wires 40 may have other cross-sectional shapes (such as hexagonal, triangular, polygonal, or even a variable cross-sectional shape).

As FIG. 3 also illustrates, the individual wires 40 are parallel. Each wire 40 in the plurality 32 of wires is parallel to every other wire 40 in the structural cable 16. The individual wires 40 are parallel along their entire length L (illustrated as reference numeral 50) from one end 18 of the structural cable 16 to the opposite end 20 of the structural cable 16. Each wire 40 in the plurality 32 of individual wires may also be equal in length 50 to every other wire 40 in the structural cable 16. Each wire 40 in the structural cable 16, in other words, may be parallel to, and equal in length 50 to, every other wire 40. Because each wire 40 is parallel to every other wire 40, no winding operation is required. The structural cable 16, in other words, need not be spirally or helically wound.

Figure 4:
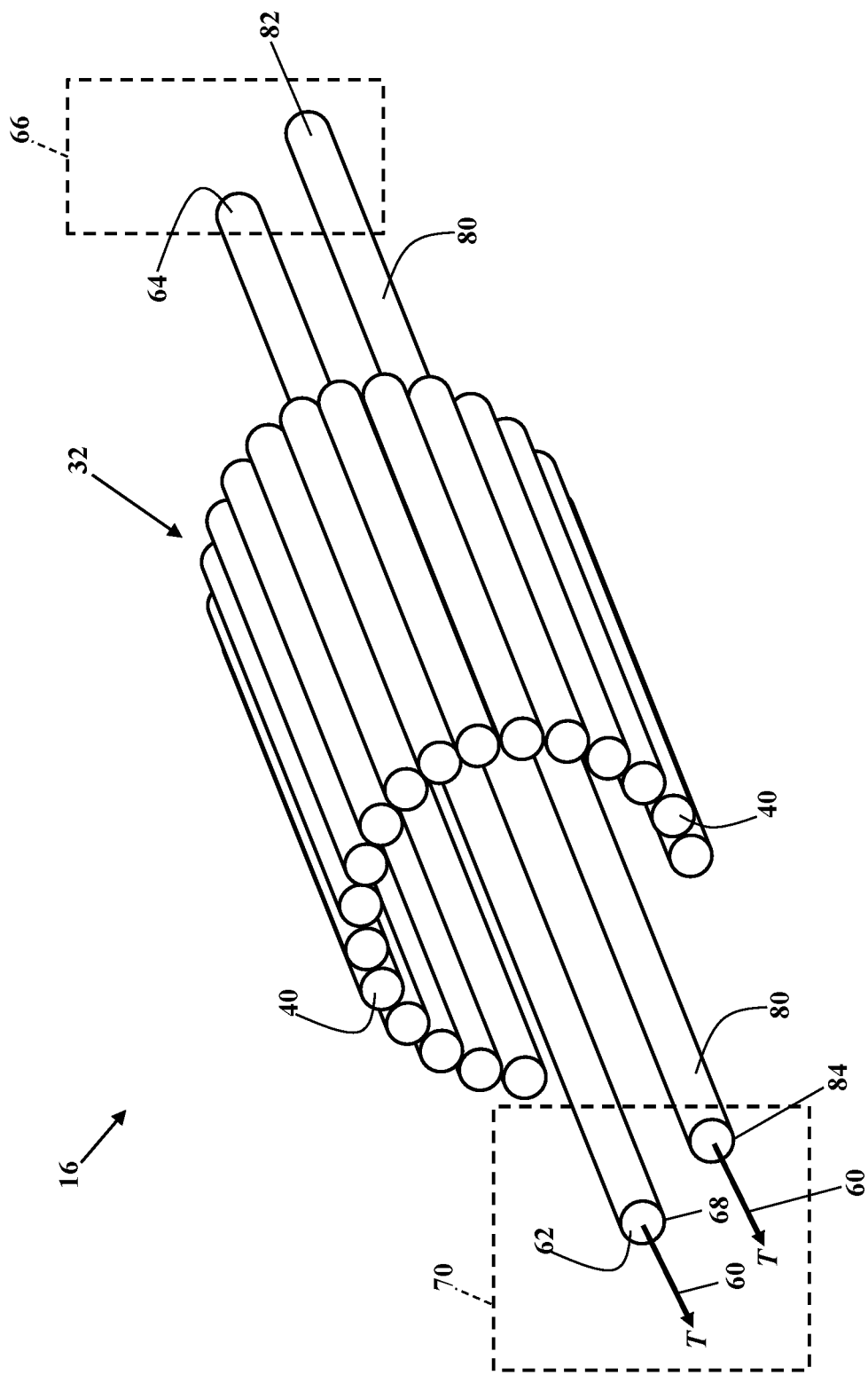
FIG. 4 is a schematic illustrating tensioning of the structural cable, according to exemplary embodiments.

FIG. 4 is another detailed schematic illustrating the structural cable 16, according to exemplary embodiments. Here, though, only a few wires 40 in the structural cable 16 are shown to simplify the illustration. Exemplary embodiments apply a tension value T (illustrated as reference numeral 60) to each wire 40 in the structural cable 16. That is, each wire 40 in the plurality 32 of individual wires may have an equal, or nearly equal, tension to every other wire 40 in the structural cable 16. As FIG. 4 illustrates, a tension value 60 is applied to an individual wire 62. An end 64 of the individual wire 62 is mechanically locked, held, or secured in a first fixture 66. The first fixture 66 is generically shown, as any apparatus or method may be used to frictionally prevent the end 64 of the individual wire 62 from slipping as tension is applied. An opposite end 68 of the individual wire 62 is then drawn or pulled to the desired tension value 60. The tension value 60 may be measured with a dynamometer, but any apparatus or method of measuring tension may be used. When the desired tension value 60 is attained, the opposite end 68 of the individual wire 62 is then mechanically locked, held, or secured in a second fixture 70. Again, the second fixture 70 is generically shown, as any apparatus or method may be used to maintain the tension value 60 applied to the individual wire 62.

Exemplary embodiments pretension every wire 40 in the structural cable 16. Once the tension value 60 is applied to the individual wire 62, then a second wire 80 in the structural cable 16 is selected. The second wire 80 may be adjacent to the first-selected individual wire 62, or the second wire 80 may be circumferentially or radially distant. Regardless of how or where the second wire 80 is chosen, the same tension value 60 is applied to the second wire 80. An end 82 of the second wire 80 is mechanically locked, held, or secured in the first fixture 66, and an opposite end 84 is pulled to the desired tension value 60. Once the desired tension value 60 is attained, the opposite end 84 of the second wire 80 is then mechanically locked, held, or secured in the second fixture 70.

Exemplary embodiments repeat this process or procedure for each wire 40 in the structural cable 16. The tension value 60 is individually applied or pulled to each wire 40 in the structural cable 16. Each wire 40 in the plurality 32 of individual wires may thus have the equal tension value 60 to every other wire 40 in the structural cable 16. In most cases, of course, the tension value 60 will be a nominal value with a permissible variation. Exemplary embodiments thus individually pull each wire 40 in the structural cable 16 to the nominal value within the permissible variation (such as ±1%).

Tension is applied to each wire, not strands of wires. Methods are known that tension strands of plural wires. A strand, in the art of structural cable, is defined as a group of multiple wires. Conventional methods are known that apply tension to a strand of multiple wires. Exemplary embodiments, in contradistinction, apply the tension value 60 to each individual wire 40 in the structural cable 16. Each wire 40 in the plurality 32 of individual wires has the equal tension value 60 as every other wire 40 in the structural cable 16.

Individual pretensioning of each wire 40 will provide lighter, cheaper, and stronger cable designs. An individually-tensioned structural cable may be made that weighs significantly less than conventional designs, but the strength of the structural cable is still greater than conventional designs. Alternatively, exemplary embodiments may be used to construct a structural cable that is similar in size to conventional designs, but is substantially stronger to support greater loads and/or spans. Regardless, exemplary embodiments offer greater design alternatives that require less material cost.

The tension value 60 may be any value that suits performance requirements. A low tension value 60, for example, may be applied to each wire 40, but the plurality 32 of wires may be difficult to keep straight and to maintain the desired length (illustrated as reference numeral 50 in FIG. 3). Moreover, a low tension value 60 may make it difficult to retain the desired geometry of the bundle (illustrated as reference numeral 36 in FIG. 2). In practice, then, a minimum of the tension value 60 may be the nominal load that overcomes any memory or metallurgical cast of the wire coils. For example, if 9 gauge, 145 ksi yield wire (0.148 inch diameter) is used, the nominal load is approximately 70 pounds per wire load (depending on the control temperature). Other diameters of wires will have varying yield strengths, and the corresponding nominal loads are easily calculated and tested by those of ordinary skill in the art. In some cases the weight of the wire 40 itself may meet or exceed the nominal load. For example, if the wire 40 is long enough, its actual gravity load or the weight of the wire 40 may meet or exceed the calculated nominal tensioning load.

No tension adjustments are required. Exemplary embodiments repeatedly apply the tension value 60 to each wire 40 in the structural cable 16. Once the tension value 60 is applied to a wire 40, though, the tension value 60 need not be adjusted. Each wire 40 in the plurality 32 of individual wires may be tensioned without rechecking and adjusting a previously-applied tension in another wire. The manufacturing of the structural cable 16 may thus rapidly and sequentially apply the tension value 60 to each wire 40 without revisiting previous measurements.

Figure 5:
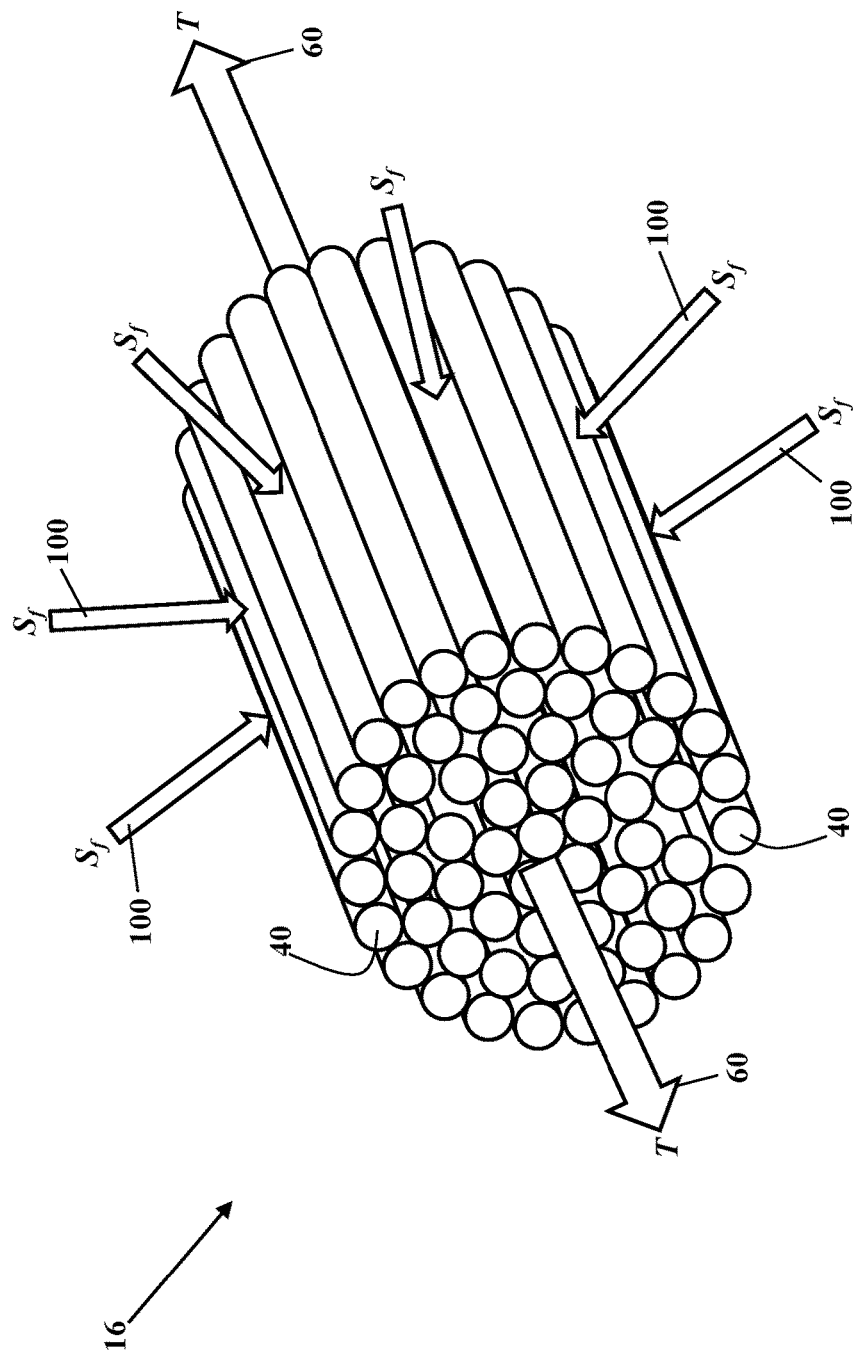
FIGS. 5 and 6 are schematics illustrating means for securing the plurality of wires, according to exemplary embodiments.
Figure 6:
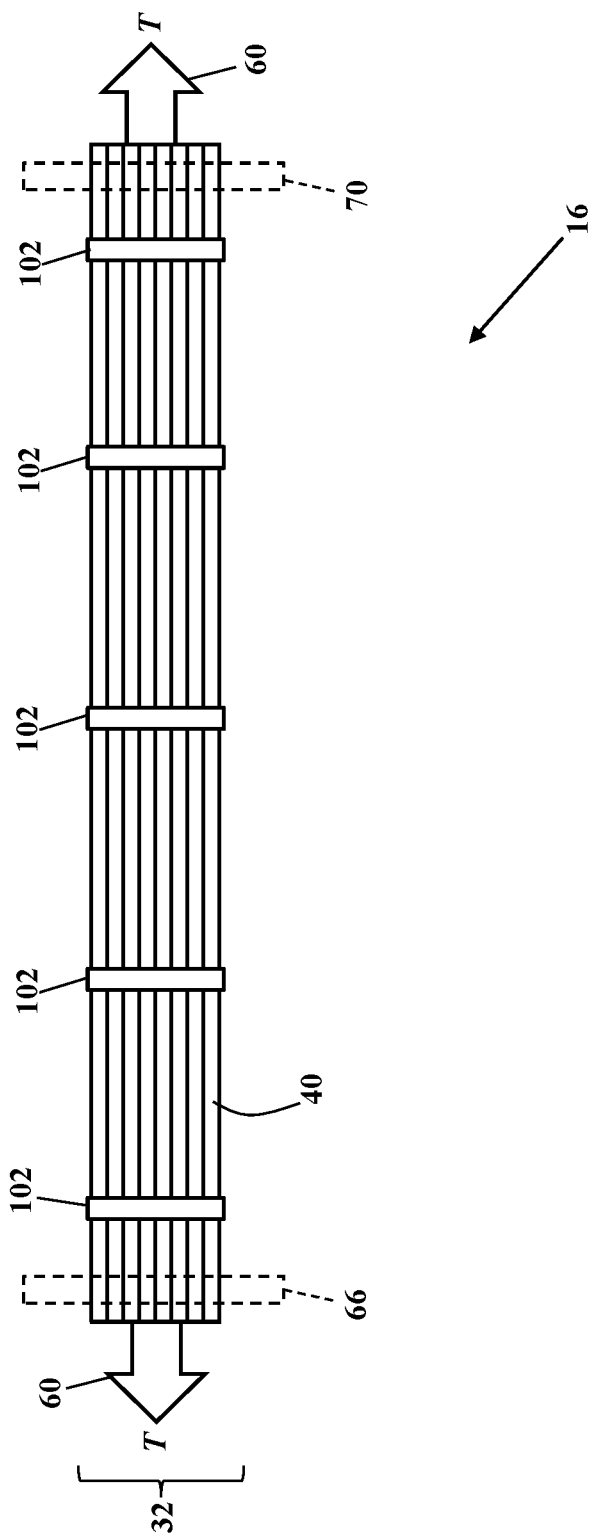

FIGS. 5 and 6 are schematics illustrating means for securing the plurality 32 of wires, according to exemplary embodiments. Once each wire 40 in the structural cable 16 is tensioned to the tension value 60, the tension value 60 should be maintained for subsequent processing. Exemplary embodiments may thus seize the structural cable 16 to maintain the tension value 60 in each wire 40. As FIG. 5 illustrates, a seizing force $S_f$ (illustrated as reference numeral 100) is applied along an outer circumference of the structural cable 16. For simplicity, FIG. 5 only illustrates a segment or portion of the structural cable, but the seizing force 100 may be applied at multiple locations along the structural cable 16. A fixture or press may apply the seizing force 100 to maintain the tension value 60 in each wire 40. FIG. 6, for example, illustrates bands or seizings 102 spaced along the structural cable 16. The bands or seizings 102 are constructed and sized to circumferentially apply the seizing force 100 at multiple locations along the structural cable 16. Regardless of how the seizing force 100 is applied, the seizing force 100 is applied inwardly of the first fixture 66 and inwardly of the second fixture 70. The seizing force 100 maintains the tension value 60 in each wire 40. The structural cable 16 may then be cut to a desired overall length (illustrated as reference numeral 50 in FIG. 3). Attachments and/or sockets may then be added to each end (e.g., illustrated as reference numerals 18 and 20 in FIGS. 1 and 3) of the structural cable 16.

Exemplary embodiments may include an oxidation inhibitor. The plurality 32 of wires may have a sacrificial coating or polymer coating that helps prevent the structural cable 16 from corroding. One or more of the individual wires 40 may additionally or alternatively include the oxidation inhibitor.

Exemplary embodiments may also include strands of the wires. Several individual wires 40 may be grouped or bundled into a strand, as is known. Multiple strands may then be bundled to produce the structural cable 16. Exemplary embodiments may thus be applied to each strand, such that each wire 40 in a strand is individually tensioned to the equal tension value 60.

Figure 7:
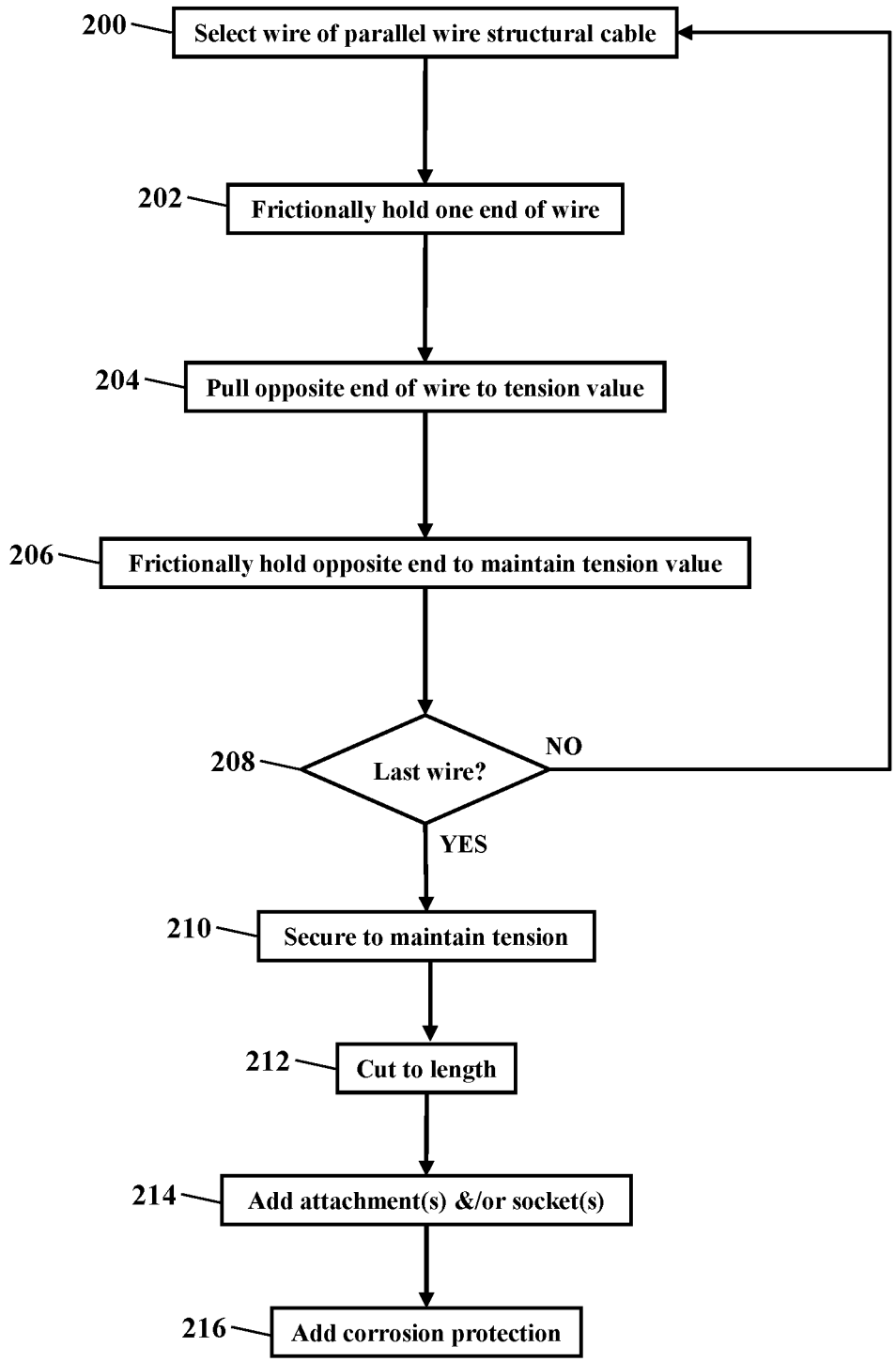
FIG. 7 is a flowchart illustrating a method of manufacturing a parallel wire cable, according to exemplary embodiments.

FIG. 7 is a flowchart illustrating a method of manufacturing a parallel wire cable, according to exemplary embodiments. A wire is selected of a parallel wire structural cable (Block 200). The wire is frictionally held at one end (Block 202). An opposite end of the wire is pulled to the tension value 60 (Block 204). The opposite end is then frictionally held to maintain the tension value 60 (Block 206). If wires remain to tension (Block 208), then another wire is selected (Block 200) and the tension value 60 is applied, until a last wire is tensioned (Block 208). The parallel wire structural cable is secured or seized to maintain tension in the wires (Block 210). The parallel wire structural cable is cut to length (Block 212). An end attachment or socket is added (Block 214). Corrosion protection may be added (Block 216).

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A process, comprising:
   i) frictionally holding an end of a wire of a parallel wire structural cable;
   ii) pulling an opposite end of the wire to a tension value;
   iii) frictionally holding the opposite end of the wire to maintain the tension value; and
   iv) repeating i) through iii) for each other of a plurality of parallel wires in the parallel wire structural cable individually and securing the parallel wires as a bundle to maintain tension.

2. The process according to claim 1, further comprising cutting the parallel wire structural cable to a length.

3. The process according to claim 1, further comprising adding an attachment to a cable end of the parallel wire structural cable.

4. The process according to claim 1, further comprising adding a corrosion inhibitor to the wire.

5. The process according to claim 1, further comprising adding a corrosion inhibitor to the parallel wire structural cable.

6. The process according to claim 1, further comprising seizing the parallel wires as the bundle.

* * * * *